United States Patent [19]

Coe et al.

[11] Patent Number: 4,925,460
[45] Date of Patent: May 15, 1990

[54] CHABAZITE FOR GAS SEPARATION

[75] Inventors: Charles G. Coe, Macungie; Thomas R. Gaffney; Rajagopalan S. Srinivasan, both of Allentown, all of Pa.

[73] Assignee: Air Products and Chemicals, Inc., Allentown, Pa.

[21] Appl. No.: 383,128

[22] Filed: Jul. 20, 1989

[51] Int. Cl.$^5$ .............................................. B01D 53/04
[52] U.S. Cl. ............................................. 55/25; 55/58; 55/66; 55/68; 55/75; 55/389; 55/328; 423/329; 502/64
[58] Field of Search .................. 55/25, 26, 58, 62, 66, 55/68, 75, 389; 423/118, 328 Z, 329; 502/64

[56] References Cited

U.S. PATENT DOCUMENTS

| | | | |
|---|---|---|---|
| 3,106,593 | 10/1963 | Benesi et al. | 55/75 X |
| 3,140,933 | 7/1964 | McKee | 55/68 |
| 3,515,680 | 6/1970 | Flank | 502/64 |
| 4,151,119 | 4/1979 | Gladrow | 502/64 |
| 4,503,024 | 3/1985 | Bourgogne et al. | 423/328 Z |
| 4,544,378 | 10/1985 | Coe et al. | 55/68 |
| 4,610,700 | 9/1986 | Miller et al. | 55/389 X |
| 4,663,052 | 5/1987 | Sherman et al. | 55/75 X |
| 4,732,584 | 3/1988 | Coe et al. | 55/66 |
| 4,744,805 | 5/1988 | Maroulis et al. | 55/75 X |
| 4,747,854 | 5/1988 | Maroulis et al. | 55/75 X |
| 4,859,217 | 8/1989 | Chao | 55/75 X |

FOREIGN PATENT DOCUMENTS

| | | | |
|---|---|---|---|
| 704706 | 3/1965 | Canada | 55/75 |
| 2347574 | 4/1974 | Fed. Rep. of Germany | 55/389 |

OTHER PUBLICATIONS

R. W. Rousseau, "Adsorption", Handbook of Separation Process Technology, John Wiley and Sons, New York, p. 645 (1987).

Ralph T. Yang, "Gas Separation by Adsorption Processes", Butterworth's, London, 1987.

H. Minato and M. Watanabe, "Adsorption of $CO_2$ and $N_2$ Gases on Some Natural Zeolites and Their Ion-Exchanged Forms," Scientific Paper, General Education, Univ. of Tokyo, 1978, 28, 218.

S. Furuyama and K. Sato, "Sorption of Argon, Oxygen, Nitrogen, Nitric Acid, and Carbon Monoxide by Lithium, Sodium, Potassium, and Cesium Mordenites," J. Phys. Chem., 1982, 86, 2498-2503.

C. G. Coe et al, "Molecularly Engineered, High Performance Adsorbent", ACS Symposium Ser., 1988, 368, 478-491.

*Primary Examiner*—Robert Spitzer
*Attorney, Agent, or Firm*—Mark L. Rodgers; William F. Marsh; James C. Simmons

[57] ABSTRACT

An improved adsorbent for gas separation comprising a lithium exchanged chabazite having a Si/Al ratio between 2.1 and 2.8 wherein at least 65% of the exchangeable ion capacity is in the lithium form.

20 Claims, 1 Drawing Sheet

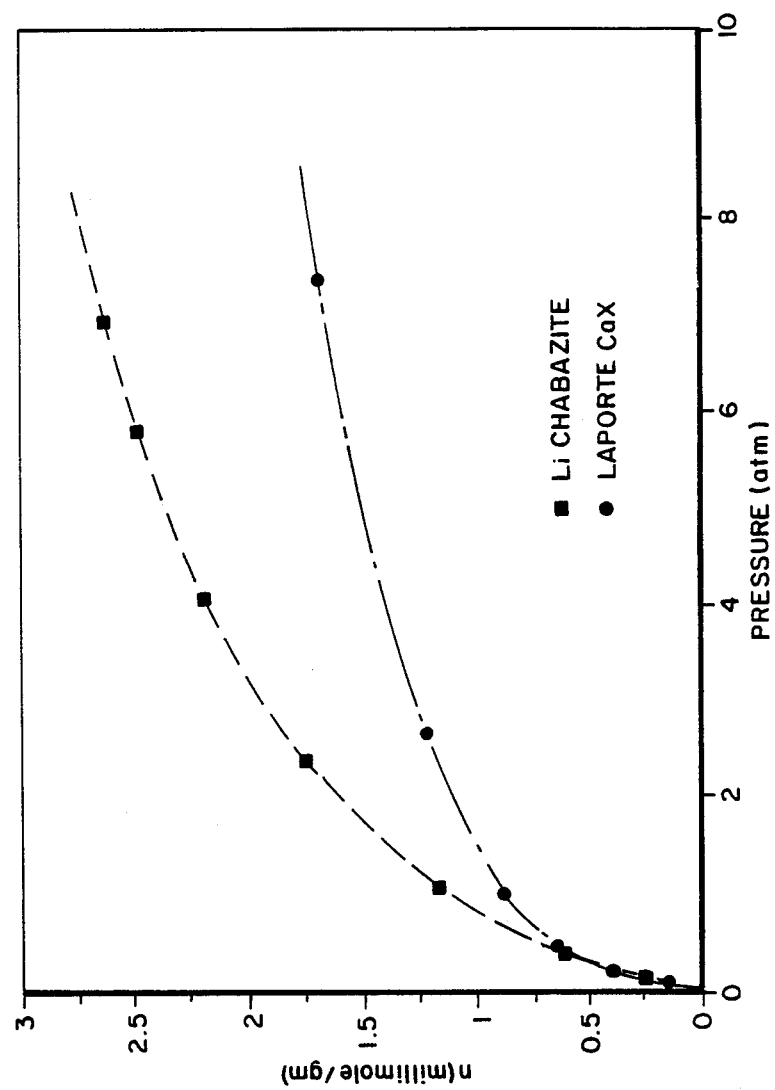

4,925,460

CHABAZITE FOR GAS SEPARATION

TECHNICAL FIELD

The present invention relates to improved chabazite adsorbents and the use of such adsorbents in gas separation processes.

BACKGROUND OF THE INVENTION

Molecular sieve zeolites have long been observed to demonstrate selective adsorption when in contact with a variety of adsorbable mixtures. This attribute may be utilized to effect a variety of separations, as for example, the removal of hydrocarbons from $H_2$-containing streams and the removal of nitrogen from air as well as other well known separations using pressure swing or vacuum swing processes. The adsorptive selectivity of the zeolite towards one or more components of a mixture must be maximized to optimize the efficiency of the desired separation. Assuming all other engineering factors remain constant, the adsorption characteristics of the material selected for the separation process influences both the production level and the purity of the gases produced. The gas industry is always looking for ways to improve bulk gas separation processes. Significant benefits are realized when the production rate of gas per volume of the adsorbent can be increased.

Workers in the field of air separation have concentrated the major portion of their efforts making process improvements of various kinds to the pressure swing adsorption (PSA) processes. Since the initial publication on PSA cycles in 1960 many improvements have been developed to improve the separation efficiency of the PSA processes. These are summarized in recent reviews by Keller and coworkers (Keller, G. E., Anderson, R. A. and Yon, C. M. "Adsorption" in Handbook of Separation Process Technology, ed. R. W. Rousseau, John Wiley and Sons, New York, p. 645 (1987), and Yang, R. T. "Gas Separation by Adsorption Processes", Butterworth's, London (1987)). It is clear from the vast amount of literature on adsorption that much more attention has been given to the process and relatively little to new adsorbents which may improve the PSA process. It is well known that the adsorbent's properties influence the efficiency of a PSA process and may even impact the choice of the specific process steps for a given separation. Most of the efforts to date have concentrated on A and X-type zeolites, largely due to their commercial availability.

U.S. Pat. No. 3,140,933 discloses the utility for air separation of the lithium form of all zeolites having an apparent pore size of at least 4 Å, and claims that LiX is most preferred due to its relatively high cation content.

Two Japanese publications describe the adsorption properties of Li mordenite (Minato, H.; Watanabe, M.; Scientific Paper General Education, Univ. of Tokyo, 1978, 28, 218; and Furuyama, S.; Katsumi, S.; J. Phys. Chem. 1982, 86, 2498-2503). These workers showed that compared to the sodium form, the lithium form of natural mordenite exhibits higher $N_2$ capacity.

U.S. Pat. No. 4,544,378 discloses that highly exchanged CaX (Si/Al=1.23) with most of the calcium ions in the dehydrated/dehydroxylated state exhibit large $N_2$ capacities and $N_2/O_2$ selectivities. More recently it has been shown (Coe, C. G., Kuznicki, S. M., Srinivasan, R.; Jenkins, R. J. ACS Symposium Ser. 1988, 368 478-491) that low silica X zeolite (Si/Al=1.0) in the calcium form has more $N_2$-accessible calcium ions giving rise to high $N_2$ capacities and $N_2/O_2$ selectivities. However, these CaLSX adsorbents have poor hydrothermal stability and cannot be readily dehydrated on a commercial scale without undergoing a significant amount of cation hydrolysis leading to a loss of zeolite content and an inferior air separation adsorbent. Additionally, while both of the above calcium X-type adsorbents are useful for PSA processes that operate at subatmospheric conditions, they have limited working capacity in higher pressure applications.

U.S. Pat. No. 4,732,584 teaches that calcium chabazites have the highest $N_2$ capacities at 1 atmosphere of any known adsorbent. However, the presence of calcium alters the overall shape of the isotherm and reduces the pressure where the adsorbent approaches saturation (i.e., where there is a very small change in capacity with relatively large incremental pressure changes above 0.5 atmospheres at 30° C.). Therefore, the calcium form of chabazite probably does not have a large enough change in gas capacity between typical operating pressures (referred to as working capacity) for either VSA or PSA type applications to be practical.

BRIEF SUMMARY OF THE INVENTION

The present invention is an improved adsorbent and a process for using said adsorbent to separate at least one component of a gas mixture from at least one other component. The adsorbent comprises a lithium exchanged chabazite having a Si/Al ratio from about 2.1 to 2.8 wherein at least 65% of the exchangeable ion capacity is in the lithium form. The gas mixture containing two or more components is brought into contact with the lithium chabazite adsorbent such that at least one component is selectively adsorbed by the chabazite to produce a gas stream concentrated in the unadsorbed component. The lithium chabazites of the present invention are especially well suited for separating nitrogen from feedstreams containing nitrogen and oxygen, such as air, by selectively adsorbing nitrogen. The adsorbents can be used in any suitable adsorption processes, such as vacuum swing or pressure swing adsorption processes.

The chabazite adsorbents of the present invention have lithium cations in accessible positions for direct interaction with $N_2$ which results in higher $N_2$ capacities and $N_2/O_2$ selectivities compared to the lithium form of other adsorbents. In addition, these lithium chabazite adsorbents exhibit the proper isotherm shape, particularly for $N_2$ and $O_2$, to increase the working productivity of the adsorbent.

BRIEF DESCRIPTION OF THE DRAWING

The drawing of FIG. 1 is a graph comparing the $N_2$ adsorption isotherms of the lithium chabazite of the present invention with a commercially available CaX, at about 30° C.

DETAILED DESCRIPTION OF THE INVENTION

The present invention is an improved adsorbent for gas separation processes. The adsorbent comprises a lithium exchanged chabazite having a Si/Al ratio from about 2.1 to 2.8 wherein at least 65% of the exchangeable ion capacity is in the lithium form. The adsorbent can be used to separate any gas mixture comprising a first component and a second component wherein said first component has a higher heat of adsorption than said second component. For example, these adsorbents can effectively be used to separate nitrogen from air or one or more other components such as $O_2$, Ar, $H_2$, He, Kr, Ne, Xe and mixtures thereof, and also to separate $CH_4$ from gases such as $H_2$, He and mixtures thereof. The gas mixture is brought into contact with the lithium chabazite adsorbent, such that said chabazite selectively adsorbs the first component; i.e. the component having the higher heat of adsorption, to produce a gas stream concentrated in the second component. Such adsorption processes are typically carried out at temperatures ranging from about 15° to 70° C. and within a pressure range from about 0 to 15 atm. Typical processes in which the absorbents can be used include vacuum swing and pressure swing adsorption processes for air separation. It has been found that when a chabazite having a Si/Al ratio from about 2.1 to 2.8 is ion exchanged with lithium, such that at least 65% of the exchangeable ion sites are occupied by the lithium, it exhibits superior adsorption properties than prior art adsorbents, especially for nitrogen. The proper siting of the optimum number of lithium cations in accessible positions for these adsorbents provides for direct interaction with $N_2$ and gives rise to higher $N_2$ capacities and $N_2/O_2$ selectivities for lithium chabazite compared to the lithium form of other adsorbents. Additionally, these lithium chabazite adsorbents have the proper isotherm shape, particularly for $O_2$ and $N_2$, to increase the working productivity of the adsorbent.

Extra-framework cations are the adsorption sites in zeolites for weakly interacting adsorbates, and therefore, maximizing the number of these sites and the strength of interaction between the adsorbate gas and the adsorption site results in an increase in adsorptive capacity. The shape of the adsorption isotherms of nitrogen on lithium chabazites is distinct from the shape of isotherms for divalent cation forms. In contrast to other ion forms, the lithium form of chabazite maintains a high capacity for $N_2$ and has the desired isotherm shape to be useful in both PSA (typically operated from 1–15 atm) and VSA (typically operated from 0–3 atm) based on air separation processes. This is due to the combination of a high packing density of cations which are accessible to nitrogen in the chabazite structure, and to the strong interaction of $N_2$ with the small Li+ cations. For improved adsorption capacity over other adsorbents, however, it has been found that at least 65% of the exchangeable ion sites on the chabazite should be exchanged with lithium.

We have found that the nitrogen capacity for lithium chabazites having Si/Al ratios from 2.1–2.8, is unusually high whereas more aluminous samples (Si/Al=1.8–2.1) and more siliceous samples Si/Al greater than 2.8 sorb much less nitrogen. In the more aluminous range the chabazite structure becomes packed with monovalent cations, and sorption capacity is reduced as cations pack too closely in the pores and thermal stability is reduced. Chabazites with Si/Al greater than 2.8 probably have an insufficient number of $N_2$-accessible lithium ions to achieve high capacity since these small cations may prefer sites inaccessible to $N_2$.

Previous attempts to increase adsorption capacity of zeolites have been made by incorporating lithium cations in the mordenite structure. While the use of lithium does result in a stronger interaction with nitrogen than for other monovalent cations, the lower packing density of lithium cations in mordenite compared to chabazite along with the tendency for pore blocking limits the adsorptive capacity of lithium mordenite to values significantly below those of lithium chabazite. Additional attempts to increase capacity and selectivity of adsorbents have included the use of divalent cations to increase the strength of interaction of the adsorbate gas and the cation. CaX and CaA zeolites are high capacity nitrogen selective adsorbents. However, compared to LiCHA, they approach saturation with nitrogen at much lower pressures, which limits the working capacity of these adsorbents in VSA and PSA processes. As stated before, LiCHA has superior working capacity which more than offsets its slightly lower selectivity. This allows air to be separated more efficiently over LiCHA than over other adsorbents.

Since chabazite has a smaller pore size than X zeolites, (3.7 Å×4.2 Å versus 7.4 Å), one might expect a more pronounced micropore resistance in the chabazite. Contrary to this expectation, we found that $N_2$ and $O_2$ mass transfer in the lithium chabazite powder is too fast to measure accurately using volumetric uptake transients. This observation suggests that the chabazite's micropore resistance is probably unimportant. It is pertinent to note that Ruthven et al., [Canadian Journal of Chemical Engineering 1984 62, 526] have found, by gas chromatographic screening, that $N_2$ uptake in Na and Ca chabazites is characterized by a negligible intracrystalline mass transfer resistance at 25° C.

SYNTHESIS PROCEDURE

The siliceous synthetic powdered chabazites for these studies were prepared according to the method of Bourgoyne (U.S. Pat. No. 4,503,024). Zeolite Y, silica sol, and KOH were converted to pure chabazite by heating at 100° C. for 2 to 3 days. Mixtures of silica and Y-type zeolites having Si/Al ratios from 2.5 to 4.0 gave pure chabazites whereas more siliceous compositions produced mixtures of chabazite and unreacted Y zeolite. The preparations of more aluminous chabazites were carried out using procedures described in another related application Ser. No. 07/334,642. Typical preparations using either low silica or low template concentrations are given below.

PREPARATION OF CHABAZITE POWDER
(Si/Al=2.1)

LOW SILICA PREPARATION: Aluminum hydroxide (60.6 g), sodium hydroxide (54.56 g), potassium hydroxide (35.0 g), tetramethylammonium hydroxide (4.48 g), silica (Ludox HS30, 420.8 g), and water (269 g) are combined to give a mixture of composition $2.67Na_2O:0.89K_2O:0.04(TMA)_2O:7.0SiO_2:Al_2O_3:110H_2O$. The mixture was heated for 3 days at 95° C. in a sealed polypropylene reactor.

LOW TEMPLATE PREPARATION: Aluminum hydroxide (60.6 g), sodium hydroxide 160.32 g), potassium hydroxide (86.51 g), tetramethylammonium hydroxide (0.07 g), silica (Ludox HS30, 1052 g), and water (676 g) are combined to give a mixture of composition $6.67Na_2O2.2K_2O:0.0006(TMA)_2O:17.5SiO_2:Al_2O_3:276H_2O$. The mixture was heated for 1 day at 95° C. in a sealed polypropylene reactor.

PREPARATION OF CHABAZITE EXTRUDATES

Since adsorption processes typically require particles larger than 20 mesh, we attempted to prepare chabazite extrudates from extrudates of zeolite Y. We found that more silica is required to prepare pure chabazite from zeolite Y extrudate. A starting composition of Si/Al=3.5 gives chabazite contaminated with a small amount of zeolite Y, whereas values of 4 to 5 give pure chabazite which contains alumina binder. The alumina binder is apparently not inert and is partially dissolved and incorporated into the zeolite. Therefore, additional silica is required when $Al_2O_3$ binder is present to keep the composition within the narrow range in which pure chabazite crystallizes. More siliceous or more aluminous compositions result in recovery of zeolite Y with only minor amounts of chabazite formed. The KOH/HY ratio is important. We found that lower KOH/HY ratios will not effect conversion of KY to chabazite. While we have found that 6 to 12M KOH effectively converts the Y zeolite to high grade chabazite, it is believed that somewhat lower concentrates may work and also that there is no upper limit to the concentration of KOH which can be used for this conversion. Thus reactor productivity can be increased by increasing the concentration of KOH, and pure chabazite extrudate can be produced. We estimate that the pelletized product made by this method is 88% chabazite and 12% $Al_2O_3$, which means that we converted 40% of the binder in the zeolite pellet into chabazite. This method produces a superior adsorbent, since adsorptive capacity decreases as binder content increases.

The chabazite products were typically converted into the lithium form using a batch ion exchange procedure. The chabazite was first exchanged four times with 2M NaCl at 100° C. and then the resulting sodium chabazite exchanged four times with 1M LiCl at 100° C. This produced a chabazite having greater than 85% of its exchangeable cations in the lithium form. Alternatively we demonstrated that the chabazite could be exchanged directly into the lithium form in a continuous manner using a LiCl in ion exchange column heated to ~90° C.

Dehydration of the chabazite to a level of optimum performance can be carried out by any method which will remove the water from the zeolite cavity, including water surrounding the cations, without causing the collapse of the zeolite structure. To achieve this in a practical manner, the chabazite can be maintained at a temperature in the range of 250°–500° C. under any conditions suitable to lower the water content of the zeolite to less than about 1.5% without causing structural damage to the zeolite.

The following examples are presented to illustrate the present invention but are not meant to be limiting.

EXAMPLES

In the following examples all parts and percentages are by weight unless otherwise indicated. Nitrogen and oxygen isotherms were measured at 30° C. from 0 to 1 atmosphere (unless stated otherwise) using a volumetric adsorption apparatus. Prior to the uptake measurements, each adsorbent was first thoroughly dehydrated for 16 to 18 hours to a final temperature of 400° C. unless otherwise indicated. In all cases the samples were heated at 1° to 2° C. per minute up to the desired temperature while maintaining a pressure of less than $10^{-5}$ Torr in the system. All $N_2$ adsorption uptakes were measured at 30° C. and 1 atmosphere pressure and are reported as cc(STP)/g.

EXAMPLE 1

The effect of Si/Al ratio on the $N_2$ capacity of lithium chabazite powders and extrudates was measured in accordance with the above procedure and the results are reported in Table 1 below. The data in Table 1 show that for a series of highly exchanged lithium chabazites there is clearly an optimum range for Si/Al ratio where the adsorbent's $N_2$ capacity is considerably higher than for other Si/Al ratios. Whereas the lithium form of a readily available sedimentary chabazite (Si/Al=3.6) which is highly crystalline sorbs only 16 cc $N_2$/g, the corresponding synthetic chabazite with an Si/Al of about 2.5 has over 50% higher $N_2$ capacity (26.5 cc $N_2$/g). Additionally, the $N_2$ capacities for lithium chabazites having Si/Al ratios in this optimum range are also higher than the capacities exhibited by commonly used adsorbents such as CaX.

TABLE 1

Analytical Data on Lithium Chabazites

| Reactant Composition[a] | Zeolitic Si/Al (NMR) | $N_2$ Capacity | Lithium Exchange Level (%) |
|---|---|---|---|
| TMA-CHA | 2.1 | 20.7 | 89 |
| 5:1 Powder | 2.28 | 26.5 | 87 |
| 6:1 Powder | 2.16 | 27.6 | 90 |
| 7:1 Powder | 2.50 (2.35–2.62)[b] | 26.5 | 91 |
| 8:1 Powder | 2.59 | 27.0 | 91 |
| 8:1 Powder | 2.8 | 10.2 | 63 |
| Durkee | 3.6 | 16.7 | 88 |
| 7:1 Extrudate | 1.82 | 15.8 | 79 |
| 8:1 Extrudate | 2.19 | 24.5 | 85 |
| 9:1 Extrudate | — | 20.5 | 70 |
| 10:1 Extrudate | 2.62 | 23.6 | 73 |

[a]The $SiO_2/Al_2O_3$ ratios of the reactant mixture excluding the alumina content of the binder for the extrudates.
[b]Multiple syntheses yielded materials spanning this composition range.

EXAMPLE 2

In order to evaluate the potential of Li chabazite for air separation, nitrogen and oxygen isotherms were measured for the material from 0 to 8 atm at 30° C. and 60° C. The data was then used in a global equilibrium model (GEM) which is routinely used as an indicator of relative performance in adsorbent screening. This model is similar to "Flash" calculations in distillation (e.g., W. L. McCabe, and J. C. Smith, "Unit Operations in Chemical Engineering", 3rd edition, McGraw Hill, New York (1976), p. 534). A key assumption in the model is that the mass transfer zones remain extremely narrow in each step of the process; i.e., zone-spreading due to mass-transfer resistances and isotherm-shape are taken to be negligible. As a first approximation, this is a reasonable assumption in the case of equilibrium-based separation processes. The omission of zone-spreading causes the model-predictions to be, in general, over estimated but, as mentioned above, the model has been found to be good for relative performance-ranking. It is pertinent to note that the model satisfies mass and energy balances, and calculates mixture adsorption using the Ideal Adsorbed Solution (IAS) theory (A. L. Meyers and J. M. Prausnitz, American Institute of Chemical Engineers Journal, 11, 121 (1965) which is accepted for physical adsorption of air on zeolites at ambient temperatures (G. W. Miller, K. S. Knaebel, and K. G. Ikels, "Equilibria of Nitrogen, Oxygen, Argon and Air in Molecular Sieve 5A" American Institute of Chemical Engineers Journal, 33, 194 (1987); and Srinivasan, R., Auvil, S. R., and Coe, C. G., "Tracer Pulse Chromatography for Measuring Equilibrium Adsorption in Air-Zeolite Systems", China-Japan-USA Symposium on Advanced Adsorption Science and Technology—Extended Abstracts, Zhejiang University Press, China (1988)).

By way of placing the model in perspective, its predictions are compared in Table 2 with $N_2$ productivity data from an actual vacuum swing adsorption pilot plant with main beds 6 feet in length and 4 inches in diameter.

TABLE 2

$N_2$ Productivity in the VSA Process
Pilot Plant Data vs Global Equilibrium Model Predictions*

| CaX Adsorbent | Pilot Unit | Model |
|---|---|---|
| Sample 1 | 0.27 | 0.20 |
| Sample 2 | 0.29 | 0.26 |
| Sample 3 | 0.37 | 0.32 |
| Sample 4 | 0.40 | 0.37 |

*Basis:Adiabatic $N_2$ Productivity at 99.5% purity, air feed at 30° C., pump down to 65 mm Hg (millimole/wt of adsorbent)

The comparison data in Table 2 shows that the relative performance of the four CaX adsorbents is in agreement with the actual VSA-$N_2$ unit data. The large difference in $N_2$ productivity observed for different CaX adsorbents is reflected by the model.

Table 3 below presents the equilibrium adsorption properties for $N_2$ and $O_2$ along with the $N_2$ productivity for the VSA process predicted by the global equilibrium model. As shown in the Table, the equilibrium loadings for $N_2$ are significantly higher on Li chabazite than either CaX, Li or Na mordenite yet the increase in capacity does not result in an accompanying large increase in the heat of adsorption. Therefore the combination of a high $N_2$ capacity and moderate heat of adsorption gives rise to a large increase in the predicted $N_2$ productivity from a VSA-$N_2$ process.

ambient temperatures (~one atmosphere, 30° C.), LiCHA continues to sorb large amounts of nitrogen between one and ten atmospheres. This unique property allows air to be separated much more efficiently over LiCHA in a PSA process, which allows the amount of adsorbent required to be reduced and eliminates the subatmospheric operation required in a VSA process.

EXAMPLE 3

The nitrogen adsorption capacity at various pressures was measured for the lithium chabazite of the present invention and also for a commercially available CaX adsorbent. The graph of FIG. 1 compares the $N_2$ isotherms at 30° C. for one of the preferred lithium chabazites of this invention to that for a commercially available CaX adsorbent. It is easily seen that the $N_2$ capacity at pressures above 1 atm are clearly higher for lithium chabazite, and also that the working capacity of the adsorbent for typical PSA applications is much higher than that for CaX. The unusual $N_2$ adsorption properties of lithium chabazites having Si/Al ratios between 2.1 and 2.8 allow them to be superior air separation adsorbents for producing oxygen rich streams in either $O_2$ PSA or $O_2$ VSA processes.

EXAMPLE 4

Using the previously described global equilibrium model the quantity of adsorbent required to produce a lb mole of $O_2$ product per cycle was calculated for both an $O_2$ PSA and $O_2$ VSA processes. Calculation was made to compare the lithium chabazite of the present invention with a commercially available CaX adsorbent.

The $O_2$ PSA process calculations were based upon an

TABLE 3

Comparison of Lithium Chabazite with Other Zeolites

| | Examples | | Comparatives | | |
|---|---|---|---|---|---|
| Zeolite Source | Natural/CHA (Nova Scotia) | Synthetic TMA CHA | LaPorte CaX | Synthetic Mordenite | Synthetic Mordenite |
| Framework Si/Al | 2.5 | 2.6 | 1.25 | 5.0 | 5.0 |
| Mat Exchange Level | 89-Li | 89-Li | 98-Ca | 75-Li | 99-Na |
| Equilibrium Loadings at 30° C., 1 atm. (ccSTP/g) | | | | | |
| 100% $N_2$ | 28.0 | 25.1 | 18.6 | 20.4 | 14.6 |
| 100% $O_2$ | 8.0 | 6.8 | 5.7 | 6.3 | 4.7 |
| Average Isosteric Heat from 0 to 1 atm. (kcal/mole) | | | | | |
| $N_2$ | 6.4 | 7.2 | 6.7 | 7.2 | 6.4 |
| $O_2$ | 4.1 | 3.8 | 4.3 | 5.2 | 4.5 |
| $N_2/O_2$ Selectivity from IAST, Air at 30° C., 1 atm. | 6.1 | 5.8 | 8.1 | 6.2 | 4.2 |
| 5 atm | 6.0 | 4.8 | 5.3 | 5.6 | 3.8 |
| 10 atm | 6.0 | 4.5 | 4.6 | 5.4 | 3.6 |
| Adiabatic $N_2$ Productivity; VSA Equilibrium Model, Air Feed at 30° C. Pump Down to 90 mm Hg, 99% $N_2$ (millimoles $N_2$/g adsorbent) | 0.48 | 0.39 | 0.33 | 0.29 | 0.27 |

The above data show that lithium chabazite is higher in $N_2$ adsorptive capacity than other zeolites; its high capacity more than offsets its lower $N_2/O_2$ selectivity, allowing more air to be separated over LiCHA than over CaX. This results in a more efficient VSA air separation process.

In addition to its advantage in a VSA process, LiCHA has unique properties which also make it attractive as an adsorbent for pressure swing adsorption (PSA) air separation processes as demonstrated in Example 3 below. Whereas other zeolitic adsorbents are much closer to saturation with $N_2$ at low pressures and air stream at ambient conditions (T=70° F., P=14.7 psia) being fed into the adsorption bed to selectively remove the nitrogen and produce a product oxygen stream.

The $O_2$ VSA process calculations were based upon a high pressure air stream at ambient conditions (T=70° C., P=200 psia) being fed into the adsorption bed to selectively remove the nitrogen and produce a product oxygen stream.

The calculated bed size factors needed in each case are given in Table 4 below.

TABLE 4

| | Bed Size Factors (lbs)* | |
|---|---|---|
| | $O_2$ PSA | $O_2$ VSA |
| CaX | 7380 | 8772 |
| Li chabazite | 4627 | 6536 |

*lbs of adsorbents required to produce a lb mole of $O_2$ product per cycle

In both cases substantially less lithium chabazite compared to CaX is needed to produce the same quantity of oxygen. The data above show that the lithium chabazite adsorbent is significantly more productive than the CaX adsorbent.

The above examples have shown that the lithium chabazites of the present invention are improved adsorbents for producing either $N_2$ or $O_2$ product using vacuum swing or pressure swing (superatmospheric) processes.

Having thus described the present invention, what is now deemed appropriate for Letters Patent is set out in the following claims.

What is claimed is:

1. A process for separating a gas mixture comprising a first component and a second component wherein said first component has a higher heat of adsorption than the second component, said process comprising bringing said gas mixture into contact with lithium exchanged chabazite having a Si/Al ratio from about 2.1 to 2.8 wherein at least 65% of the exchangeable ion capacity is in the lithium form, such that said chabazite selectively adsorbs the first component from the gas mixture.

2. A process in accordance with claim 1 wherein nitrogen is the first component.

3. A process in accordance with claim 1 wherein said gas mixture contains nitrogen as the first component and oxygen as the second component and said chabazite selectively adsorbs nitrogen to produce an oxygen-concentrated stream.

4. A process in accordance with claim 1 wherein said gas mixture is air.

5. A process in accordance with claim 1 wherein said gas mixture is brought into contact with the chabazite adsorbent in an $O_2$ pressure swing adsorption process.

6. A process in accordance with claim 5 which is carried out within a pressure range from about 1 atm to 15 atm.

7. A process in accordance with claim 1 wherein said gas mixture is brought into contact with the chabazite adsorbent in an $O_2$ vacuum swing adsorption process.

8. A process in accordance with claim 7 wherein said gas mixture is brought into contact with said chabazite adsorbent within a pressure range from about 0 to 3 atm.

9. A process in accordance with claim 1 wherein said gas mixture is brought into contact with the chabazite adsorbent in a vacuum swing adsorption process to produce nitrogen.

10. A process in accordance with claim 1 wherein said gas mixture is brought into contact with said chabazite adsorbent at a temperature from about 15° to 70° C.

11. A process in accordance with claim 1 wherein nitrogen is selectively adsorbed from a gas mixture comprising nitrogen and a component selected from the group consisting of Ar, $H_2$, He, Kr, Ne, Xe and mixtures thereof.

12. A process in accordance with claim 1 wherein $CH_4$ is selectively adsorbed from a gas mixture comprising $CH_4$ and $H_2$, He or mixtures thereof.

13. A process in accordance with claim 1 which is carried out within a pressure range from about 0 to 15 atm.

14. An adsorbent for selectively adsorbing nitrogen from a gas mixture containing nitrogen and oxygen, said adsorbent comprising lithium exchanged chabazite having a Si/Al ratio from about 2.1 and 2.8 wherein at least 65% of the exchangeable ion capacity is in the lithium form.

15. A process for preparing a chabazite extrudate comprising: treating alumina bound zeolite Y extrudate having a total Si/Al ratio of about 1.2 with silica sol sufficient to give a mixture with Si/Al from 1.9 to 2.5 and subsequently heating the resultant mixture in the presence of KOH to produce a chabazite extrudate.

16. A process in accordance with claim 15 wherein the resultant reactant mixture is heated in the presence of 6-12M KOH.

17. A process in accordance with claim 15 wherein the chabazite extrudate are ion exchanged into the lithium form by treatment with about 1M LiCl.

18. A process in accordance with claim 17 wherein said chabazite extrudate is ion exchanged with NaCl prior to being ion exchanged with LiCl.

19. A process in accordance with claim 17 wherein the chabazite extrudate ion exchanged into the lithium form is subsequently dehydrated by heating to a temperature from 250°-500° C.

20. A process in accordance with claim 17 wherein the resultant lithium exchanged chabazite extrudate has a Si/Al ratio from about 2.1 to 2.8 and at least 65% of the exchangeable ion capacity is in the lithium form.

* * * * *

UNITED STATES PATENT AND TRADEMARK OFFICE
CERTIFICATE OF CORRECTION

PATENT NO.  :   4,925,460
DATED       :   May 15, 1990
INVENTOR(S) :   Charles G. Coe, et al It is certified that error appears in the above-identified patent and that said Letters Patent is hereby corrected as shown below:

Column 8, Line 34
        Delete "PSA" and substitute therefor -- VSA --

Column 8, Line 62
        Delete "VSA" and substitute therefore -- PSA --

Columns 7-8, TABLE 3, Column 2 Header
        Delete "/" between Natural and CHA Columns 7-8, TABLE 3, Column 3 Header
        Delete "TMA" in its entirety Signed and Sealed this Tenth Day of November, 1992

Attest:

DOUGLAS B. COMER

*Attesting Officer*    *Acting Commissioner of Patents and Trademarks*